(12) United States Patent
Farah et al.

(10) Patent No.: US 9,302,609 B2
(45) Date of Patent: Apr. 5, 2016

(54) ENHANCED CHARGE PORT DOOR REMINDER FOR A FUEL OR CHARGE CONSUMING DEVICE

(71) Applicant: GM Global Technology Operations LLC, Detroit, MI (US)

(72) Inventors: Andrew J. Farah, Troy, MI (US); Michael R. Colville, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/228,691

(22) Filed: Mar. 28, 2014

(65) Prior Publication Data

US 2015/0274063 A1    Oct. 1, 2015

(51) Int. Cl.
*G08B 21/00* (2006.01)
*B60Q 1/00* (2006.01)
*B60W 50/14* (2012.01)
*B60K 15/05* (2006.01)

(52) U.S. Cl.
CPC ............ *B60Q 1/00* (2013.01); *B60W 50/14* (2013.01); *B60K 2015/0546* (2013.01)

(58) Field of Classification Search
CPC ........................................................ B60Q 1/00
USPC ................... 340/455, 457, 438, 540
See application file for complete search history.

(56) References Cited

U.S. PATENT DOCUMENTS 7,441,414 B2 * 10/2008 Ziehr et al. .................. 62/244

* cited by examiner

*Primary Examiner* — Jeffery Hofsass
(74) *Attorney, Agent, or Firm* — BrooksGroup

(57) ABSTRACT

A number of illustrative variations may include a method of using sequential logic and vehicle sensors to produce a notification.

12 Claims, 1 Drawing Sheet

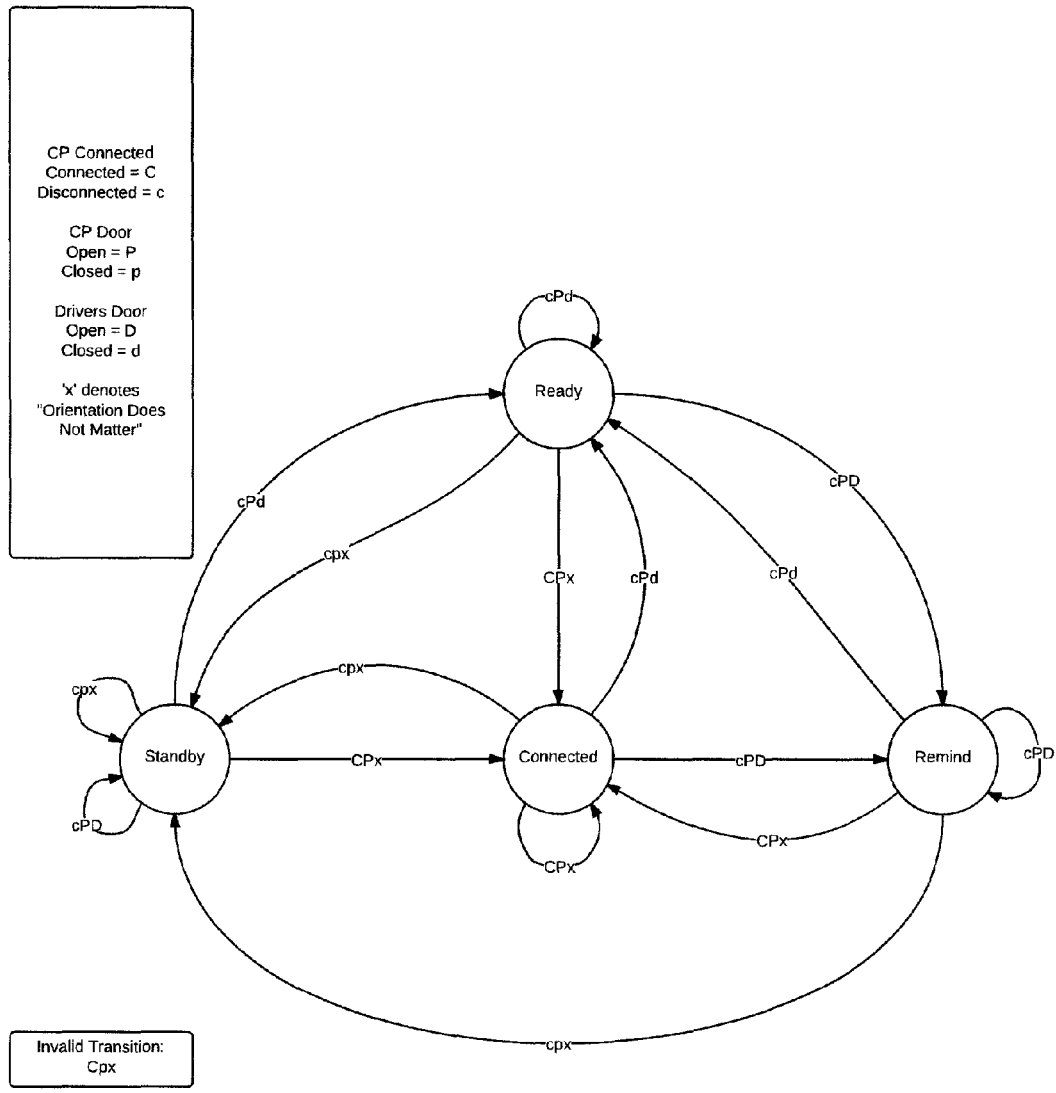

US 9,302,609 B2

ENHANCED CHARGE PORT DOOR REMINDER FOR A FUEL OR CHARGE CONSUMING DEVICE

TECHNICAL FIELD

The field to which the disclosure generally relates to includes vehicle reminder systems.

BACKGROUND

Some vehicles with a charge port door provide an indication that the door is open after the vehicle is powered on and/or taken out of park.

SUMMARY OF ILLUSTRATIVE VARIATIONS

A number of illustrative variations may include a method of using sequential logic and vehicle sensors to produce a notification.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a number of sequential logic scenarios which a controller may to track and handle.

DETAILED DESCRIPTION OF ILLUSTRATIVE VARIATIONS

The following description of the variations is merely illustrative in nature and is in no way intended to limit the scope of the invention, its application, or uses.

In a number of illustrative variations, a vehicle may consume both electrical charge and fuel during the duration of operation. The vehicle may comprise a number of components including but not limited to doors, seatbelts, seats, etc. The vehicle may also include any number of sensors which may sense and be polled and/or read by a controller. Additionally, the sensors may sense and produce signals based upon the at least one of the engagement, orientation, state or condition of any number of components. Additionally, at least one of the sensor signals or readings may be used by a controller in sequential logic as well as combinational logic.

In a number of illustrative variations, a controller, which is capable of processing sequential logic as well as combinational logic, may be housed onboard a vehicle. Additionally, a device capable of reading data from memory and/or external storage devices may be in electrical communication with vehicle components including but not limited to the controller. The controller may have onboard memory and may be in electrical communication with an external data storage device as well as external memory devices. The controller may be in electrical communication with any number of sensors, controllers, batteries, renewable energy sources or other electrical devices and may have the ability to store and timestamp data indicative of readings and/or signals from any number of sensors.

In a number of illustrative variations, a first sensor may be used to detect that a first door is open; a second sensor may be used to detect that a second door is open; a third sensor may be used to detect whether a fuel and/or charge supplying device is connected to the vehicle; and a notification may be produced based upon sequential logic applied to at least one of sequential readings or sequential signals from the third sensor, and at least one of the first sensor or second sensor.

In a number of illustrative variations, a first sensor may be used to detect whether a fueling and/or charging door of the fuel and/or charge consuming device is open; a second sensor may be used to detect whether a driver's side door of the fuel and/or charge consuming device is open; a third sensor may be used to detect whether a fuel and/or charge supplying device is connected to the fuel and/or charge consuming device; and an alert may be produced based upon at least one of sequential readings or sequential signals from the third sensor, and at least one of the first sensor or second sensor.

In another illustrative variation, a sequential logic based notification system may be bound by a particular sequence. For example, a first sensor may be used to detect whether a fueling and/or charging door of the fuel and/or charge consuming device is open. Then, a third sensor may be used to detect that a fuel and/or charge supplying device is disconnected from the fuel and/or charge consuming device. Subsequently, a second sensor may be used to detect that a driver's side door of the fuel and/or charge consuming device is opened. Finally an alert may be raised based upon at least one of sequential readings or sequential signals from the first, second and third sensor.

In a number of illustrative variations, there may be several stages or states of sequential logic, each having a name. As shown in the non-limiting illustration of FIG. 1. In FIG. 1, there are 4 states, each denoting noteworthy progress in a sequence. A sequence for a number of illustrative variations can be found in FIG. 1 by noting that there is no direct transition from "Standby" to "Remind". That is, in FIG. 1, a sequence of events must occur in order to trigger the production of a reminder, alert, notification, etc.

In a number of illustrative variations, sequential steps may be tracked by software using flags, interrupts, exception handling, signal handling or any other method known in the art or any combination of the aforementioned. For example, a first sensor may detect that a charge port door is closed and a controller may denote this by responding to at least one of a signal or reading from the first sensor by asserting a "STANDBY" flag variable in memory. Subsequently, a third sensor may detect that a fuel and/or charge supplying device is connect to the fuel and/or charge consuming device and the controller may denote this by responding to at least one of a signal or reading from the third sensor by asserting a "CONNECTED" flag variable, and deserting the "STANDBY" flag variable in memory. The third sensor may then detect that the fuel and/or charge supplying device is disconnected from the fuel and/or charge consuming device. The controller may denote this in memory by responding to at least one of a signal or reading from the third sensor by asserting a "READY" flag variable, and deserting the "CONNECTED" flag variable in memory. A second sensor may subsequently detect that a driver's door is opened and the controller may denote this by responding to at least one of a signal or reading from the second sensor by asserting a "REMIND" flag variable, and deserting the "CONNECTED" flag variable in memory. A memory reading device, which may perform a cyclic read on the "REMIND" flag variable in memory, may then read the "REMIND" flag variable and may, because the "REMIND" flag variable is asserted, and send a signal to the controller which may handle the signal by producing a notification or alert to a user after any amount of delay time.

In a number of illustrative variations, an alert may be produced by any number of sensory means including but not limited to an audio notification by a device such as a speaker, a visual notification by a device such as a display screen or an indicator light, or a physical notification such as a physical pop-out indicator or a vibrating component which may come into contact with the user. Means for producing such an alert may be located on the interior of the vehicle as well as on the exterior of the vehicle.

In a number of illustrative variations, an alert may be produced by a first source, located outside of the vehicle cabin, and further conveyed to the user through a secondary source, within the cabin of the vehicle. For example, a beep may be produced by a speaker under the hood of the car and a reminder may also be displayed as a backlit icon within the interior of the car. Further, the secondary source may require some additional step to occur before it will produce an alert. For example, the backlit icon within the interior of the car may not light up until the car is taken out of park. This additional step may also be tracked as sequential logic by the controller.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising: providing a fuel and/or consuming device having doors; providing a means of raising an alert; using at least one of a first sensor to detect whether a first door of the fuel and/or charge consuming device is open; using at least one of a second sensor to detect whether a second door of the fuel and/or charge consuming device is open; raising an alert based upon the result of a sequential logic regarding the first and second sensor readings.

Variation 2 may include the method of Variation 1 wherein the alert is raised after a predetermined time delay.

Variation 3 may include method of Variation 1 wherein the first and second sensors produce signals.

Variation 4 may include method of Variation 3 wherein the alert is raised based upon the sensor signals.

Variation 5 may include method of Variation 1 wherein the means of raising an alert is a sound producing device to produce sound.

Variation 6 may include method of Variation 1 wherein the means of raising an alert is a display to notify a user through visual means.

Variation 7 may include method of Variation 1 wherein the means of raising an alert is located outside of the cabin of the vehicle.

Variation 8 may include method of Variation 1 wherein sequential logic comprises using the first and second sensors, respectively, to indicate that the first and second doors were influenced in the sequence:
 a) the first door was opened;
 b) the second door was opened.

Variation 9 may include method of Variation 1 further comprising using at least one of a third sensor to detect whether a fuel and/or charge supplying device is connected to the fuel and/or charge consuming device and wherein raising an alert is based upon the result of a sequential logic regarding the first, second and third sensor readings.

Variation 10 may include method of Variation 9 wherein the sequential logic comprises using the first, second and third sensors, respectively, to indicate that the first and second doors, and fuel/charge supplying device connection were influenced in the sequence:
 a) the first door was opened;
 b) the fuel and/or charge supplying device was connected to the fuel and/or consuming device;
 c) the second door was opened;
 d) the fuel and/or charge supplying device was disconnected from the fuel and/or consuming device.

Variation 11 may include method of Variation 9 wherein the sequential logic comprises using the first, second and third sensors, respectively, to indicate that the first and second doors, and fuel/charge supplying device connection were influenced in the sequence:
 a) the first door was opened;
 b) the fuel and/or charge supplying device was connected to the fuel and/or charge consuming device;
 c) the fuel and/or charge supplying device was disconnected from the fuel and/or charge consuming device;
 d) the second door was opened.

Variation 12 may include method of Variation 9 wherein the sequential logic comprises using the first, second and third sensors, respectively, to indicate that the first and second doors, and fuel/charge supplying device connection were influenced in the sequence:
 a) the second door was opened;
 b) that the first door was opened;
 c) the fuel and/or charge supplying device was connected to the fuel and/or charge consuming device;
 d) the fuel and/or charge supplying device was disconnected from the fuel and/or charge consuming device.

The above description of select variations within the scope of the invention is merely illustrative in nature and, thus, variations or variants thereof are not to be regarded as a departure from the spirit and scope of the invention.

What is claimed is:

1. A method comprising:
 providing a fuel and/or consuming device having doors;
 providing a means of raising an alert;
 using at least one of a first sensor to detect whether a first door of the fuel and/or charge consuming device is open;
 using at least one of a second sensor to detect whether a second door of the fuel and/or charge consuming device is open;
 raising an alert based upon the result of a sequential logic regarding the first and second sensor readings.

2. The method of claim 1 wherein the alert is raised after a predetermined time delay.

3. The method of claim 1 wherein the first and second sensors produce signals.

4. The method of claim 3 wherein the alert is raised based upon the sensor signals.

5. The method of claim 1 wherein the raising an alert comprising producing a sound.

6. The method of claim 1 wherein the raising an alert comprises notifying a user by visual means.

7. The method of claim 1 wherein the means of raising an alert occurs outside of the cabin of the vehicle.

8. The method of claim 1 wherein the sequential logic comprises using the first and second sensors, respectively, to indicate that the first and second doors were influenced in the sequence:
 a) the first door was opened;
 b) the second door was opened.

9. The method of claim 1 further comprising using at least one of a third sensor to detect whether a fuel and/or charge supplying device is connected to the fuel and/or charge consuming device and wherein raising an alert is based upon the result of a sequential logic regarding the first, second and third sensor readings.

10. The method of claim 9 wherein the sequential logic comprises using the first, second and third sensors, respectively, to indicate that the first and second doors, and fuel/charge supplying device connection were influenced in the sequence:
 a) the first door was opened;
 b) the fuel and/or charge supplying device was connected to the fuel and/or consuming device;
 c) the second door was opened;
 d) the fuel and/or charge supplying device was disconnected from the fuel and/or consuming device.

11. The method of claim 9 wherein the sequential logic comprises using the first, second and third sensors, respectively, to indicate that the first and second doors, and fuel/charge supplying device connection were influenced in the sequence:
 a) the first door was opened;
 b) the fuel and/or charge supplying device was connected to the fuel and/or charge consuming device;
 c) the fuel and/or charge supplying device was disconnected from the fuel and/or charge consuming device;
 d) the second door was opened.

12. The method of claim 9 wherein the sequential logic comprises using the first, second and third sensors, respectively, to indicate that the first and second doors, and fuel/charge supplying device connection were influenced in the sequence:
 a) the second door was opened;
 b) that the first door was opened;
 c) the fuel and/or charge supplying device was connected to the fuel and/or charge consuming device;
 d) the fuel and/or charge supplying device was disconnected from the fuel and/or charge consuming device.

* * * * *